US012491964B2

(12) United States Patent
Stallbaumer (10) Patent No.: US 12,491,964 B2
(45) Date of Patent: Dec. 9, 2025

(54) DUAL DRIVE RIDER-PROPELLED VEHICLE

(71) Applicant: John J. Stallbaumer, Ozawkie, KS (US)

(72) Inventor: John J. Stallbaumer, Ozawkie, KS (US)

(73) Assignee: John J. Stallbaumer, Ozawkie, KS (US)

( * ) Notice: Subject to any disclaimer, the term of this patent is extended or adjusted under 35 U.S.C. 154(b) by 785 days.

(21) Appl. No.: 17/849,850

(22) Filed: Jun. 27, 2022

(65) Prior Publication Data

US 2023/0415842 A1 Dec. 28, 2023

(51) Int. Cl.
*B62M 1/12* (2006.01)
*B62K 21/02* (2006.01)
*B62K 21/12* (2006.01)
*B62K 21/18* (2006.01)

(52) U.S. Cl.
CPC ............... *B62M 1/12* (2013.01); *B62K 21/02* (2013.01); *B62K 21/12* (2013.01); *B62K 21/18* (2013.01)

(58) Field of Classification Search
CPC ..................................................... B62M 1/12
See application file for complete search history.

(56) References Cited

U.S. PATENT DOCUMENTS

| 6,032,970 A   | * | 3/2000 | Porter | B62M 1/16 280/247 |
| 7,000,934 B1  | * | 2/2006 | Capek  | B62M 1/12 280/240 |
| 2011/0095505 A1 | * | 4/2011 | Heath  | B62M 1/12 74/496 |
| 2022/0106011 A1 | * | 4/2022 | Jones  | B62K 21/24 |
| 2023/0018220 A1 | * | 1/2023 | Lieh   | B62K 21/00 |

FOREIGN PATENT DOCUMENTS

WO   WO-2015036577 A1 * 3/2015 ............. B62M 1/12

* cited by examiner

*Primary Examiner* — Alentin Neacsu
*Assistant Examiner* — Hosam Shabara
(74) *Attorney, Agent, or Firm* — HOVEY WILLIAMS LLP (57) ABSTRACT

A rider-propelled vehicle comprising a rear wheel assembly, a front wheel assembly, a dual drive and steering assembly, and a drive train. The rear wheel assembly and the front wheel assembly include 24 inch (ISO 507 mm) or larger wheels. Pedals of the dual drive and steering assembly extend laterally exterior from drive links of the dual drive and steering assembly so that feet of the rider straddle the left and right drive link. A steering train of the dual drive and steering assembly is configured so that the front wheel assembly turns entirely forward of the range of motion of left and right handlebar assemblies of the dual drive and steering assembly.

19 Claims, 9 Drawing Sheets

DUAL DRIVE RIDER-PROPELLED VEHICLE

BACKGROUND

Conventional rider-propelled vehicles do not provide an upper body workout. Many dual drive rider-propelled vehicles incorporate dual drive and steering assemblies that provide an upper body workout, but such dual drive and steering assemblies compromise many advantages of conventional rider-propelled vehicles. For example, dual drive and steering assemblies include handlebar assemblies that connect to the outsides of foot pedals. This can be dangerous because riders cannot quickly shift their feet laterally and extend their legs to stabilize or brace themselves. Furthermore, the handlebar assemblies interfere with front wheel steering movement. Some dual drive rider-propelled vehicles avoid this with small (e.g., less than 24 inch (ISO 507 mm)) wheels, but such wheels are undesirable because they ride less smoothly and cannot traverse potholes, curbs, and other obstacles as easily.

SUMMARY OF THE INVENTION

Embodiments of the present invention solve the above-mentioned problems and provide a distinct advance in the art of rider-propelled vehicles. More particularly, the present invention provides a rider-propelled vehicle that can be arm and foot-powered while preserving many advantages of conventional rider-propelled vehicles.

A rider-propelled vehicle constructed in accordance with an embodiment of the invention broadly comprises a frame, a seat, a rear wheel assembly, a front wheel assembly, a drive train, and a dual drive and steering assembly. The rider-propelled vehicle, and the dual drive and steering assembly in particular, accommodates conventional rider ergonomics, improves arm ergonomics, and allows for full-size rider-propelled vehicle wheels without compromising turning capabilities.

The frame distributes a rider's weight between the rear wheel assembly and front wheel assembly and includes a chassis and a steering fork. The seat is positioned on the chassis and includes a biasing element such as a coil spring to absorb shock between the chassis and the rider.

The rear wheel assembly is rotatably connected to a rear end of the chassis and drivably connected to the drive train. The rear wheel assembly includes a wheel, an inflatable tube, and a tire. In one embodiment, the wheel is a 24 inch (ISO 507 mm) wheel or larger.

The front wheel assembly is rotatably connected to the front fork and includes a wheel, an inflatable tube, and a tire. In one embodiment, the wheel is a 24 inch (ISO 507 mm) wheel or larger.

The front wheel assembly is spaced sufficiently forward from the rear wheel assembly (i.e., the rider-propelled vehicle has a minimum front-to-back wheel base) so that the front wheel assembly is entirely forward of a range of motion of lower members of the left and right handlebar assemblies. In this way, the front wheel assembly is free to turn laterally without potentially contacting or interfering with the left and right handlebar assemblies. This is a significant advancement for embodiments in which the wheels are 24 inch (ISO 507 mm) wheels or larger.

The drive train drivably connects the dual drive and steering assembly to the rear wheel assembly and includes sprockets and a chain, gears, beltwheels and a belt, a driveshaft, or the like. The drive train also includes derailleurs or other gear shifting components, freewheel or cassette style ratchet mechanisms, and the like.

The dual drive and steering assembly coalesces forces from leg and arm mechanics and accommodates steering inputs without affecting the leg and arm mechanics. The dual drive and steering assembly includes left and right pedal arms, left and right pedals, left and right drive links, left and right handlebar assemblies, left and right control assemblies, and a steering train.

The left and right pedal arms are substantially identical to each other and each are pivotably connected to a low point of the chassis so as to extend in opposite directions from each other. In other words, the left and right pedal arms pivot about the the chassis 180 degrees out of phase with each other.

The left and right pedals are substantially identical to each other and each are rotatably connected to one of the left and right pedal arms so that the left and right pedals may remain substantially upright as the left and right pedal arms pivot. In one embodiment, the left and right pedals are positioned laterally exterior from the left and right drive links. This provides several advantages as described in more detail below.

The left and right drive links drivably connect the left and right handlebar assemblies to the left and right pedal arms. To that end, the left and right drive links are pivotably connected to distal ends of the left and right handlebar assemblies and to distal ends of the left and right drive links. In one embodiment, the left and right drive links are positioned laterally inside of the left and right pedals, which provides several advantages as described in more detail below.

The left and right handlebar assemblies are substantially similar and thus only the left handlebar assembly will be summarized. The left handlebar assembly includes a left upper member, a left pivot arm, and a left lower member. Features of the left handlebar assembly are substantially mirrored to those of the right handlebar assembly. The left and right handlebar assemblies extend diagonally upward and laterally outward. This provides improved ergonomics and motion for the rider's arm mechanics and allows the left and right handlebar assemblies to connect to the left and right drive links laterally inward from the left and right pedals so that feet of the rider can straddle the left and right handlebar assemblies.

The left upper member connects the left handle of the left control assembly (described below) to the left lower member and is configured to rotate about its longitudinal axis relative to the left lower member. The left upper member is also configured to pivot about a laterally extending arm mechanics drive axis.

The left pivot arm extends laterally inward from the left upper member and is configured to pivot with the left upper member about the longitudinal axis of the left upper member. The left pivot arm is also linked to a left pivot pin of the steering train described below.

The left lower member connects the left upper member to the left drive link and is configured to pivot about the laterally extending arm mechanics drive axis. The left lower member has range of motion that is entirely behind the front wheel assembly.

The left and right control assemblies accommodate arm mechanics and certain control inputs and will be described separately. The left control assembly includes a left handle, a left gear shifter, and a left brake lever. The left control assembly is rotatably coupled to the left upper member.

The left handle is configured to be gripped by the rider's left hand for accommodating arm mechanics and is pivotable along with the left upper member of the left handlebar assembly for receiving steering inputs. The left handle is substantially in-line with the left upper member for improved ergonomics.

The right control assembly includes a right handle, a right gear shifter, and a right brake lever. The right control assembly is rotatably coupled to the right upper member.

The right handle is configured to be gripped by the rider's right hand for accommodating arm mechanics and is pivotable along with the right upper member of the right handlebar assembly for receiving steering inputs. The right handle is substantially in-line with the right upper member for improved ergonomics.

The steering train transfers steering inputs from the left and right handles to the front fork and hence the front wheel assembly. The steering train includes left and right pivot pins, left and right steering links, a steering bar, a steerer gear, a steered gear, a steered shaft, and left and right biasing elements.

The left pivot pin connects the left pivot arm to the left steering link. To that end, the left pivot pin is configured to rotate about its longitudinal axis relative to the left pivot arm. Furthermore, the left pivot pin is connected to the left steering link in coincidence with the laterally extending arm mechanics drive axis when the steering train is in a neutral position. This alignment keeps the steering from being affected while turning and pedaling.

The right pivot pin connects the right pivot arm to the right steering link and has a substantially vertical orientation. To that end, the right pivot pin is configured to rotate about its longitudinal axis relative to the right pivot arm. Furthermore, the right pivot pin is connected to the right steering link in coincidence with the laterally extending arm mechanics drive axis when the steering train is in the neutral position. This alignment keeps the steering from being affected while turning and pedaling.

The left steering link connects the left pivot pin to the left end of the steering bar and has a substantially rearward to forward orientation. The left steering link is connected to the left pivot pin in coincidence with the laterally extending arm mechanics drive axis when the steering train is in the neutral position.

The right steering link connects the right pivot pin to the right end of the steering bar and has a substantially rearward to forward orientation. The right steering link is connected to the right pivot pin in coincidence with the laterally extending arm mechanics drive axis when the steering train is in the neutral position.

The steering bar connects the steerer gear and the left and right steering links. Specifically, the steering bar is aligned with a central axis of the steerer gear near a middle of the steering bar and is pivotably connected to the left and right steering links near left and right ends of the steering bar.

The steerer gear is aligned with the steering bar near a middle of the steering bar so that the steerer gear and the steering bar rotate in unison about the central axis of the steerer gear. Teeth of the steerer gear are entrained with teeth of the steered gear so that clockwise rotation of the steerer gear imparts counterclockwise rotation of the steered gear.

The steered gear is aligned with the steered shaft so that the steered gear and steered shaft rotate in unison about co-located central axes of the steered gear and the steered shaft. Teeth of the steered gear are entrained with teeth of the steerer gear as described above.

The steered shaft extends downward from the steered gear to the front fork. The steered shaft is coaxially aligned with the steered gear as described above and is configured to rotate in unison with the front fork. The steered shaft also passes through a front of the chassis so that the steering train and front wheel assembly are aligned with the chassis.

The left and right biasing elements are connected between the chassis and the steering bar. The left and right biasing elements are configured to urge the steering train and hence the front wheel assembly to the neutral position.

The above-described rider-propelled vehicle provides several advantages. For example, the left and right pedals extend laterally exterior from the left and right drive links so that feet of the rider can straddle the left and right drive links. To that end, the left and right handlebar assemblies extend diagonally upward and laterally outward. This provides improved ergonomics and motion for the rider's arm mechanics and allows the left and right handlebar assemblies to connect to the left and right drive links laterally inward from the left and right pedals. Furthermore, the rear wheel assembly and front wheel assembly, while including 24 inch (ISO 507 mm) wheels or larger, have a sufficiently large wheelbase and the steering train is configured such that the front wheel assembly turns entirely forward a range of motion of the left and right handlebar assemblies.

The left and right pivot arms extend laterally inward from the left and right handlebar assemblies, which sleekens the rider-propelled vehicle. The left and right pivot pins are connected to the left and right steering links in coincidence with the laterally extending arm mechanics drive axis when the steering train is in a neutral position. This simplifies drive and steering mechanics.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Turning to the drawing figures, a rider-propelled vehicle 100 constructed in accordance with an embodiment of the invention is illustrated. The rider-propelled vehicle 100 broadly comprises a frame 102, a seat 104, a rear wheel assembly 106, a front wheel assembly 108, a drive train 110, and a dual drive and steering assembly 112. The rider-propelled vehicle 100 is shown as a bicycle, but the present invention may be embodied as other rider-propelled vehicles such as tricycles and quadricycles.

The frame 102 distributes a rider's weight between the rear wheel assembly 106 and front wheel assembly 108 and includes a chassis 114 and a steering fork 116 pivotably connected to a front end of the chassis 114. The frame 102 may include round or square tubes, angle bars, flat bars, or the like. The frame 102 may be made of lightweight metal, composite material, rigid plastic (e.g., PVC), and even organic material such as wood or bamboo.

The seat 104 may be positioned on the chassis 114 and may be at least partially made of soft materials such as foam or rubber. The seat 104 may also include a biasing element such as a coil spring to absorb shock between the chassis 114 and the rider. The seat 104 may also be adjustably connected to the chassis 114 to accommodate the rider's height or riding style.

The rear wheel assembly 106 may be rotatably connected to a rear end of the chassis 114 and drivably connected to the drive train 110. The rear wheel assembly 106 may include a wheel 118, an inflatable tube, and a tire 120. The wheel 118 may include spokes extending from a central axle to an outer rim. The inflatable tube may be seated between the outer rim of the wheel 118 and the tire 120 and inflated to provide a cushion between the wheel 118 and the ground. The tire 120 may be seated on the outer rim of the wheel 118 over the inflatable tube. The tire 120 may be relatively smooth for paved surface riding or significant traction lugs for offroad riding. In one embodiment, the wheel 118 is a 24 inch (ISO 507 mm) wheel or larger.

The front wheel assembly 108 may be rotatably connected to the front fork 116 and may include a wheel 122, an inflatable tube, and a tire 124. The wheel 122 may include spokes extending from a central axle to an outer rim. The inflatable tube may be seated between the outer rim of the wheel 122 and the tire 124 and inflated to provide a cushion between the wheel 122 and the ground. The tire 124 may be seated on the outer rim of the wheel 122 over the inflatable tube of the front wheel assembly 108. The tire 124 may be relatively smooth for paved surface riding or significant traction lugs for offroad riding. In one embodiment, the wheel 122 is a 24 inch (ISO 507 mm) wheel or larger.

The front wheel assembly 108 may be spaced sufficiently forward from the rear wheel assembly 106 (i.e., the rider-propelled vehicle 100 may have a minimum wheel base) so that the front wheel assembly 108 is entirely forward of a range of motion of lower members of the left and right handlebar assemblies 132A,B. In this way, the front wheel assembly 108 is free to turn laterally without potentially contacting or interfering with the left and right handlebar assemblies 132A,B. This is a significant advancement for embodiments in which the wheels 118,122 are 24 inch (iSO 507 mm) wheels or larger.

The drive train 110 drivably connects the dual drive and steering assembly 112 to the rear wheel assembly 106 and may include sprockets and a chain, gears, beltwheels and a belt, a driveshaft, or the like. The drive train 110 may also include derailleurs or other gear shifting components, freewheel or cassette style ratchet mechanisms, and the like.

The dual drive and steering assembly 112 coalesces forces from leg and arm mechanics and accommodates steering inputs without affecting the leg and arm mechanics. The dual drive and steering assembly 112 includes left and right pedal arms 126A,B, left and right pedals 128A,B, left and right drive links 130A,B, left and right handlebar assemblies 132A,B, left and right control assemblies 134A,B, and a steering train 136.

The left and right pedal arms 126A,B are substantially identical to each other and each are pivotably connected to a low point of the chassis 114 so as to extend in opposite directions from each other. In other words, the left and right pedal arms 126A,B may pivot about the low point of the chassis 114 180 degrees out of phase with each other.

The left and right pedals 128A,B are substantially identical to each other and each are rotatably connected to one of the left and right pedal arms 126A,B so that the left and right pedals 128A,B may remain substantially upright as the left and right pedal arms 126A,B pivot. In one embodiment, the left and right pedals 128A,B are positioned laterally exterior from the left and right drive links 130A,B. This provides several advantages as described in more detail below.

The left and right drive links 130A,B drivably connect the left and right handlebar assemblies 132A,B to the left and right pedal arms 126A,B. To that end, the left and right drive links 130A,B may be pivotably connected to distal ends of the left and right handlebar assemblies 132A,B and to distal ends of the left and right drive links 130A,B. In one embodiment, the left and right drive links 130A,B are positioned laterally inside of the left and right pedals 128A,B, which provides several advantages as described in more detail below.

The left and right handlebar assemblies 132A,B accommodate arm mechanics and steering inputs and will be described separately. The left handlebar assembly 132A includes a left upper member 138A, a left pivot arm 140A, and a left lower member 142A. Features of the left handlebar assembly 132A are substantially mirrored to those of the right handlebar assembly 132B. The left and right handlebar assemblies 132A,B may extend diagonally upward and laterally outward. This provides improved ergonomics and motion for the rider's arm mechanics and allows the left and right handlebar assemblies 132A,B to connect to the left and right drive links 130A,B laterally inward from the left and right pedals 128A,B so that feet of the rider can straddle the left and right handlebar assemblies 132A,B.

The left upper member 138A connects the left handle of the left control assembly 134A (described below) to the left lower member 142A and may be configured to rotate about its longitudinal axis relative to the left lower member 142A. The left upper member 138A may also be configured to pivot about a laterally extending arm mechanics drive axis.

The left pivot arm 140A extends laterally inward from the left upper member 138A and is configured to pivot with the left upper member 138A about the longitudinal axis of the left upper member 138A. The left pivot arm 140A is also linked to a left pivot pin of the steering train 136 described below.

The left lower member 142A connects the left upper member 138A to the left drive link 130A and may be configured to pivot about the laterally extending arm mechanics drive axis. The left lower member 142A may have a range of motion that is entirely behind the front wheel assembly 108.

The right handlebar assembly 132B is similar to the left handlebar assembly 132A except its features and components are substantially mirrored. The right handlebar assembly 132B includes a right upper member 138B, a right pivot arm 140B, and a right lower member 142B.

The right upper member 138B connects the right handle of the right control assembly 134B (described below) to the right lower member 142B and may be configured to rotate about its longitudinal axis relative to the right lower member 142B. The right upper member 138B may also be configured to pivot about the laterally extending arm mechanics drive axis.

The right pivot arm 140B extends laterally inward from the right upper member 138B and is configured to pivot with the right upper member 138B about the longitudinal axis of the right upper member 138B. The right pivot arm 140B is also linked to a right pivot pin of the steering train 136 described below.

The right lower member 142B connects the right upper member 138B to the right drive link 130B and may be configured to pivot about the laterally extending arm mechanics drive axis. The right lower member 142B may have a range of motion that is entirely behind the front wheel assembly 108.

The left and right control assemblies 134A,B accommodate arm mechanics and certain control inputs and will be described separately. The left control assembly 134A includes a left handle 144A, a left gear shifter 146A, and a left brake lever 148A. The left control assembly 134A may be rotatably coupled to the left upper member 138A.

The left handle 144A may be configured to be gripped by the rider's left hand for accommodating arm mechanics and may be pivotable along with the left upper member 138A of the left handlebar assembly 132A for receiving steering inputs. The left handle 144A may be substantially in-line with the left upper member 138A for improved ergonomics.

The left gear shifter 146A may be positioned on or near the left handle 144A for convenient access by a left finger or thumb. The left gear shifter 146A may be connected via cable or linkage to the drive train 110 for changing a gear ratio of the drive train 110.

The left brake lever 148A may be positioned on or near the left handle 144A for convenient access by a left finger or thumb. The left brake lever 148A may be connected via cable or linkage to a disc brake or pad brake on one of the rear wheel assembly 106 and front wheel assembly 108.

The right control assembly 134B includes a right handle 144B, a right gear shifter 146B, and a right brake lever 148B. The right control assembly 134B may be rotatably coupled to the right upper member 138B.

The right handle 144B may be configured to be gripped by the rider's right hand for accommodating arm mechanics and may be pivotable along with the right upper member 138B of the right handlebar assembly 132B for receiving steering inputs. The right handle 144B may be substantially in-line with the right upper member 138B for improved ergonomics.

The right gear shifter 146B may be positioned on or near the right handle 144B for convenient access by a right finger or thumb. The right gear shifter 146B may be connected via cable or linkage to the drive train 110 for changing a gear ratio of the drive train 110.

The right brake lever 148B may be positioned on or near the right handle 144B for convenient access by a right finger or thumb. The right brake lever 148B may be connected via cable or linkage to a disc brake or pad brake on one of the rear wheel assembly 106 and front wheel assembly 108.

Figure 1:
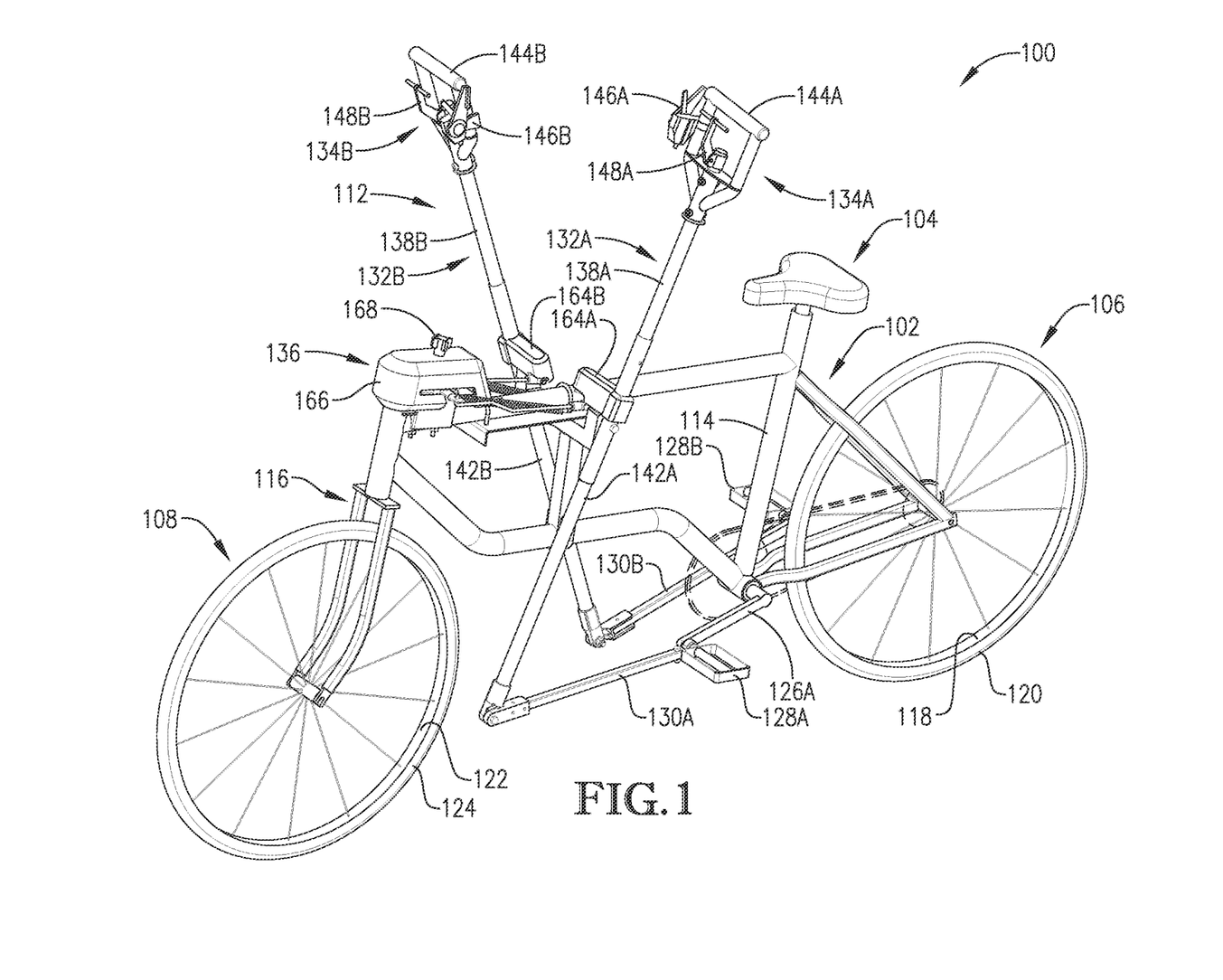
FIG. 1 is a perspective view of a rider-propelled vehicle constructed in accordance with an embodiment of the invention.
Figure 2A:
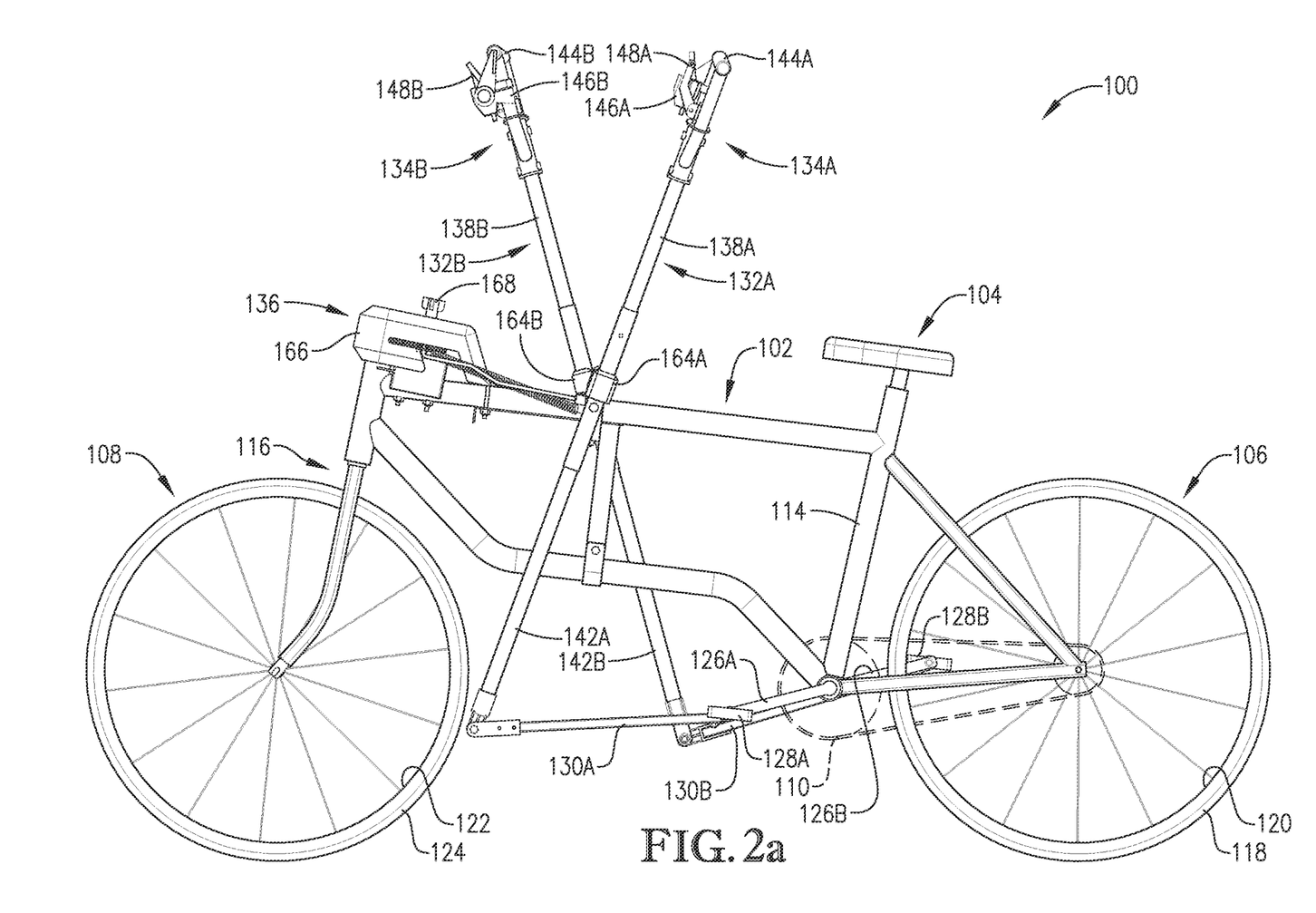
FIG. 2a is a side elevation view of the rider-propelled vehicle of FIG. 1.
Figure 2B:
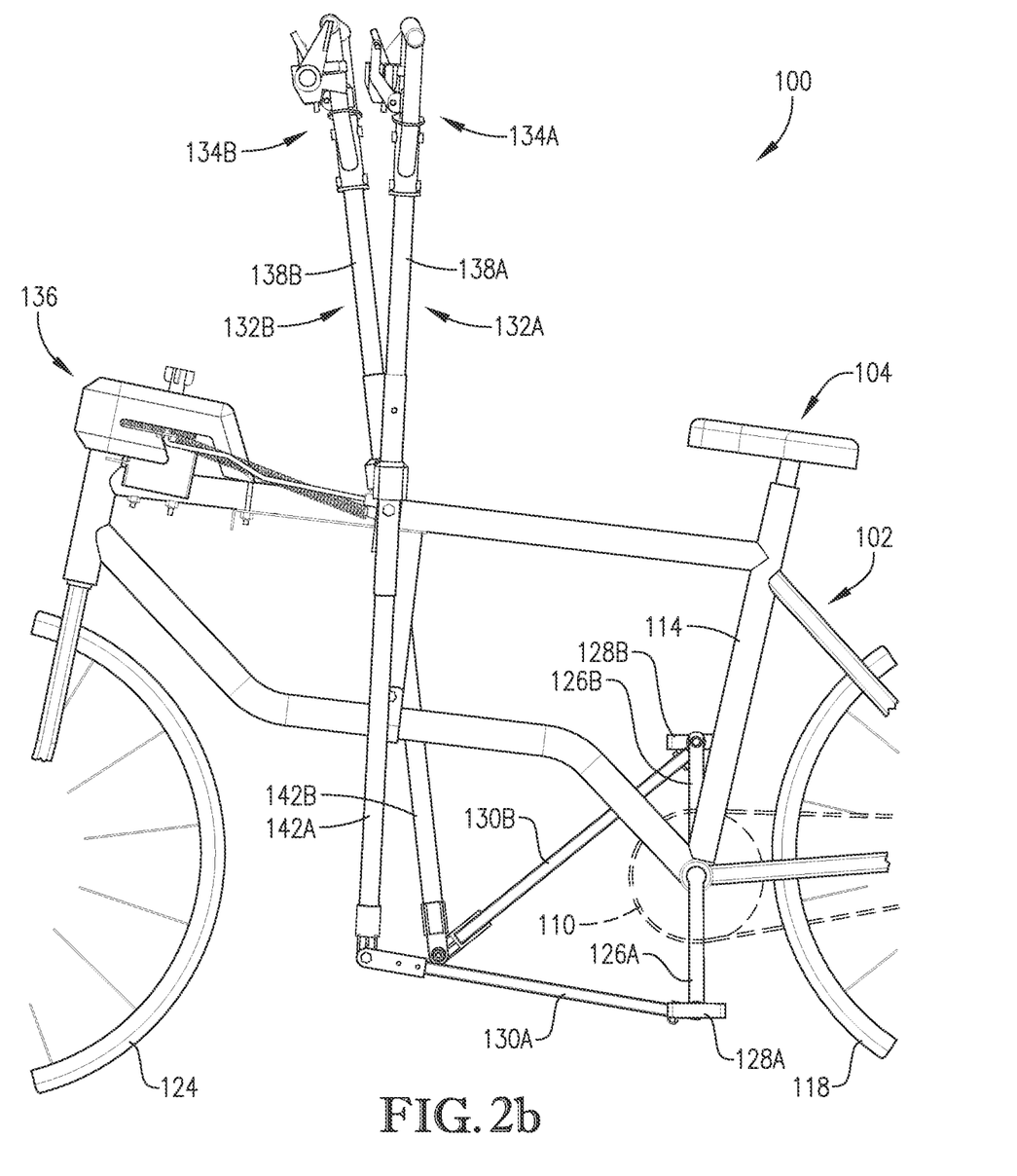
FIG. 2b is an enlarged side elevation view of portions of the rider-propelled vehicle of FIG. 1.
Figure 2C:
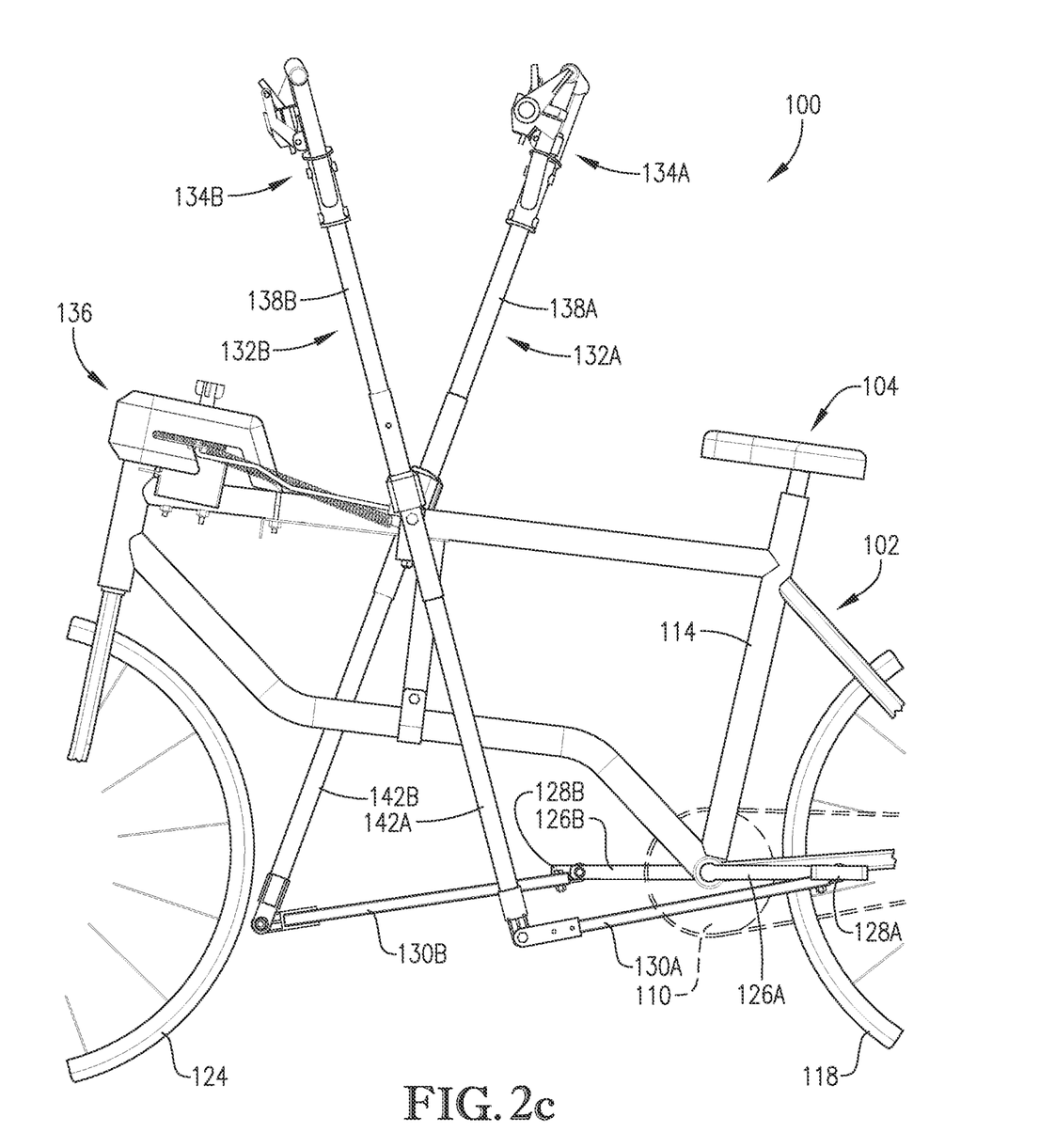
FIG. 2c is an enlarged side elevation view of portions of the rider-propelled vehicle of FIG. 1.
Figure 2D:
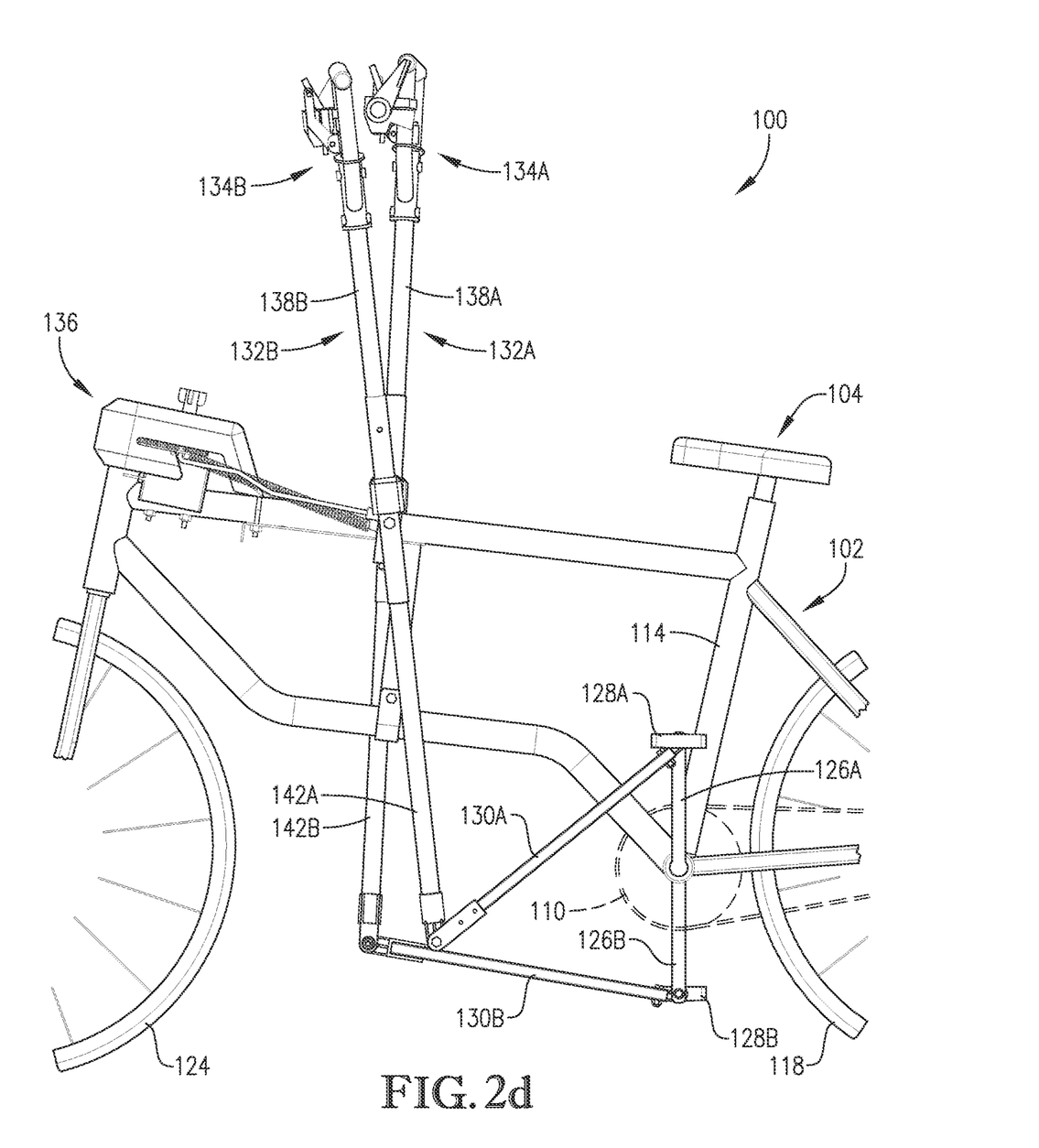
FIG. 2d is an enlarged side elevation view of portions of the rider-propelled vehicle of FIG. 1.
Figure 3:
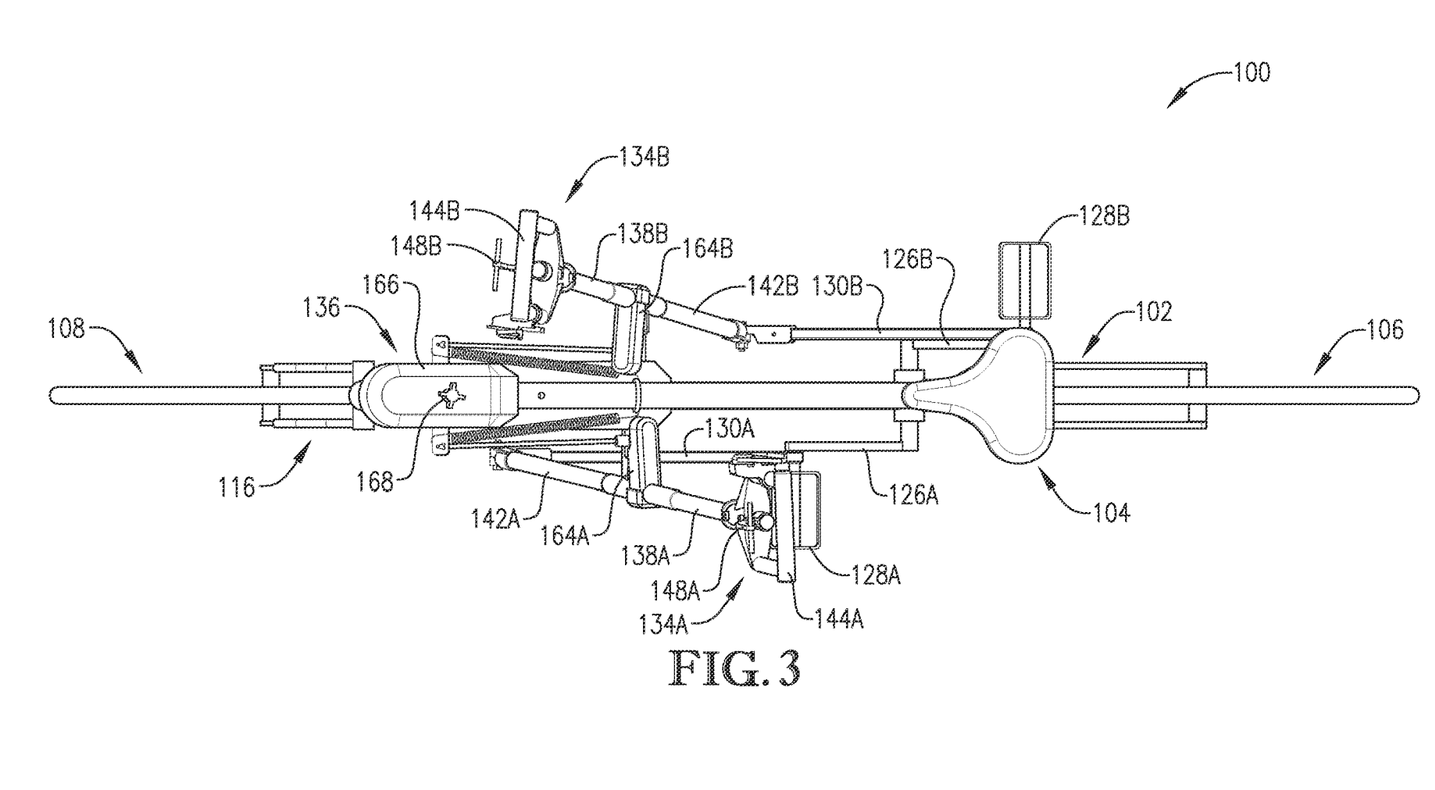
FIG. 3 is a plan view of the rider-propelled vehicle of FIG. 1.
Figure 4:
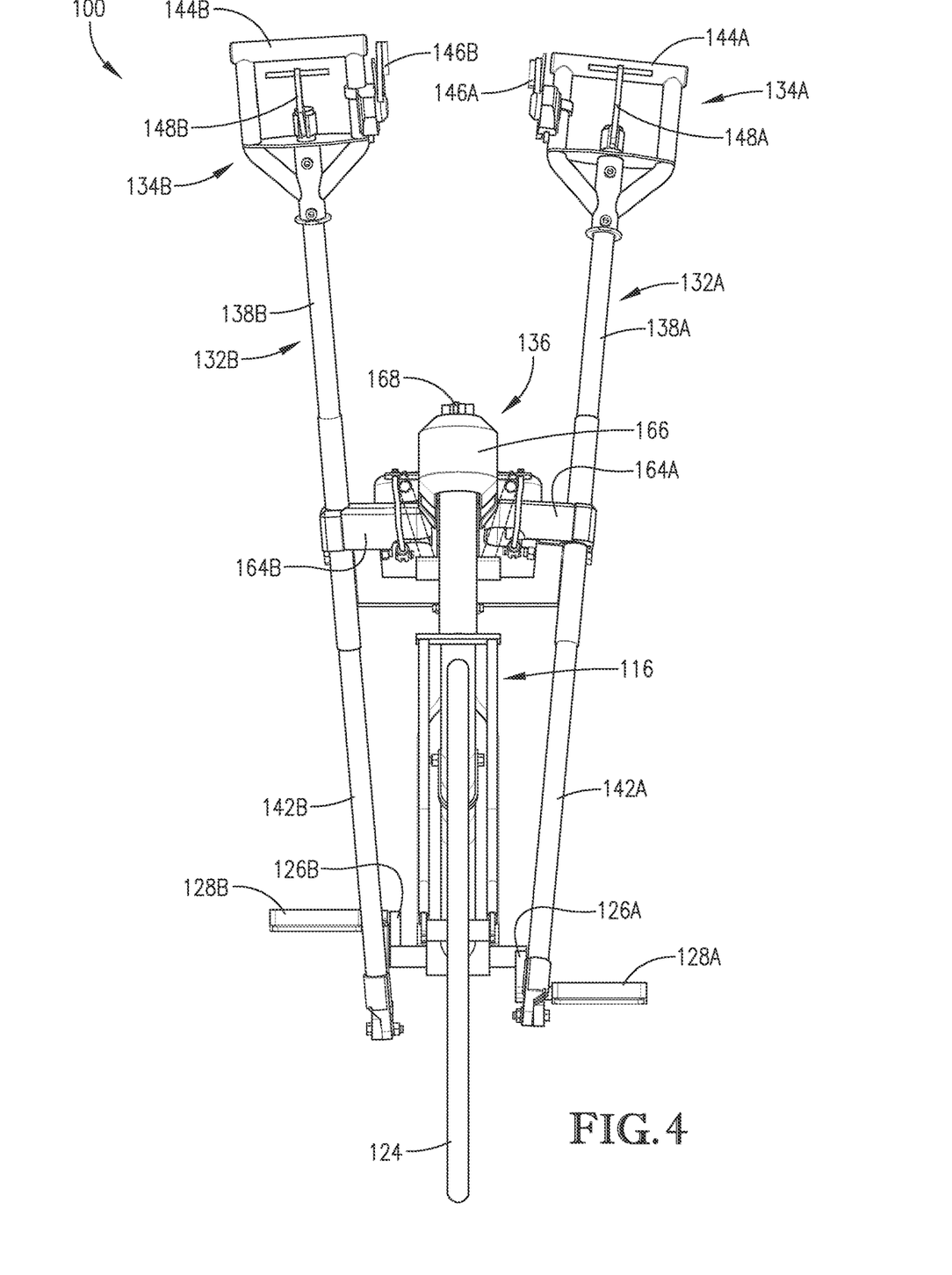
FIG. 4 is a front elevation view of the rider-propelled vehicle of FIG. 1.
Figure 5:
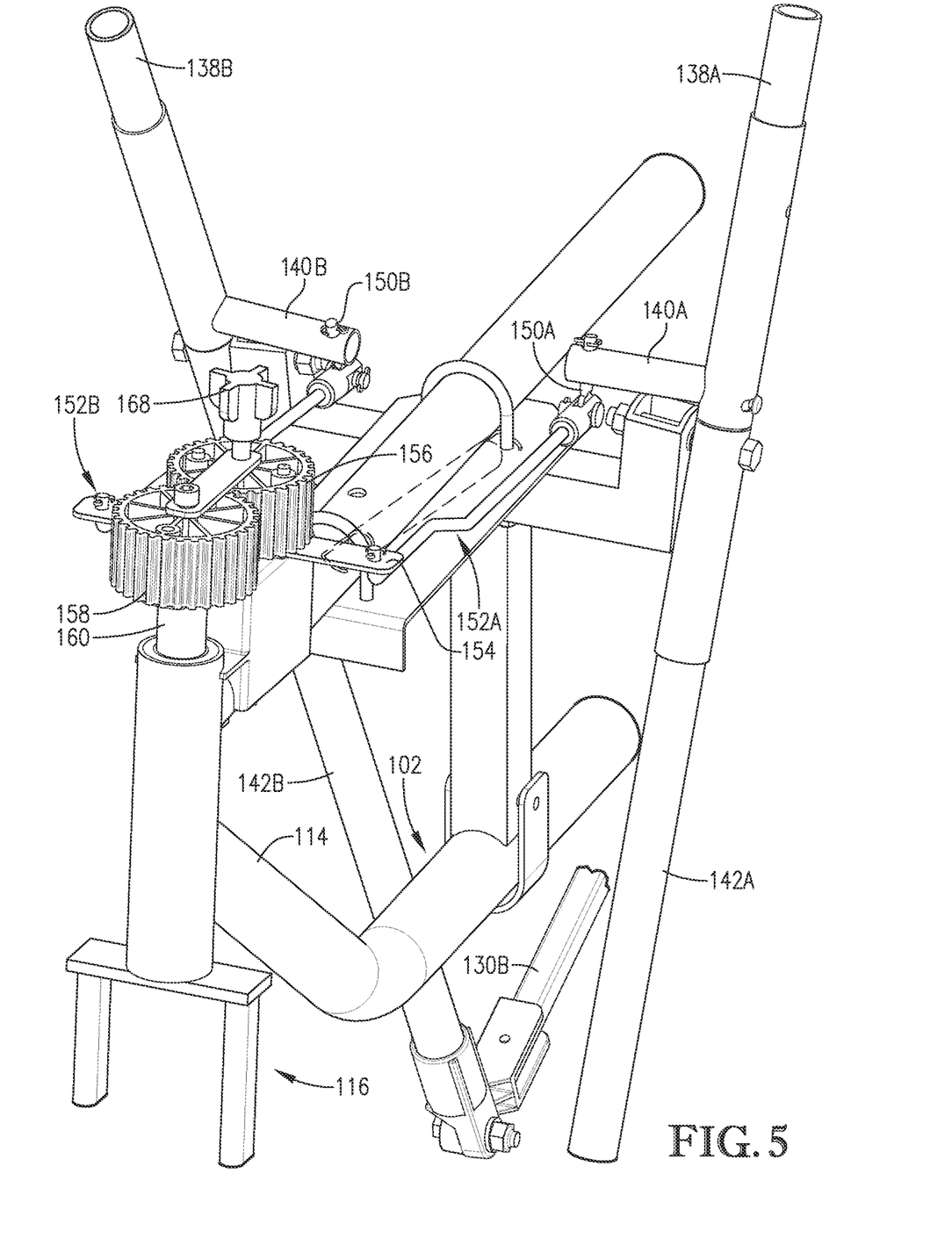
FIG. 5 is an enlarged perspective view of portions of the rider-propelled vehicle of FIG. 1.
Figure 6:
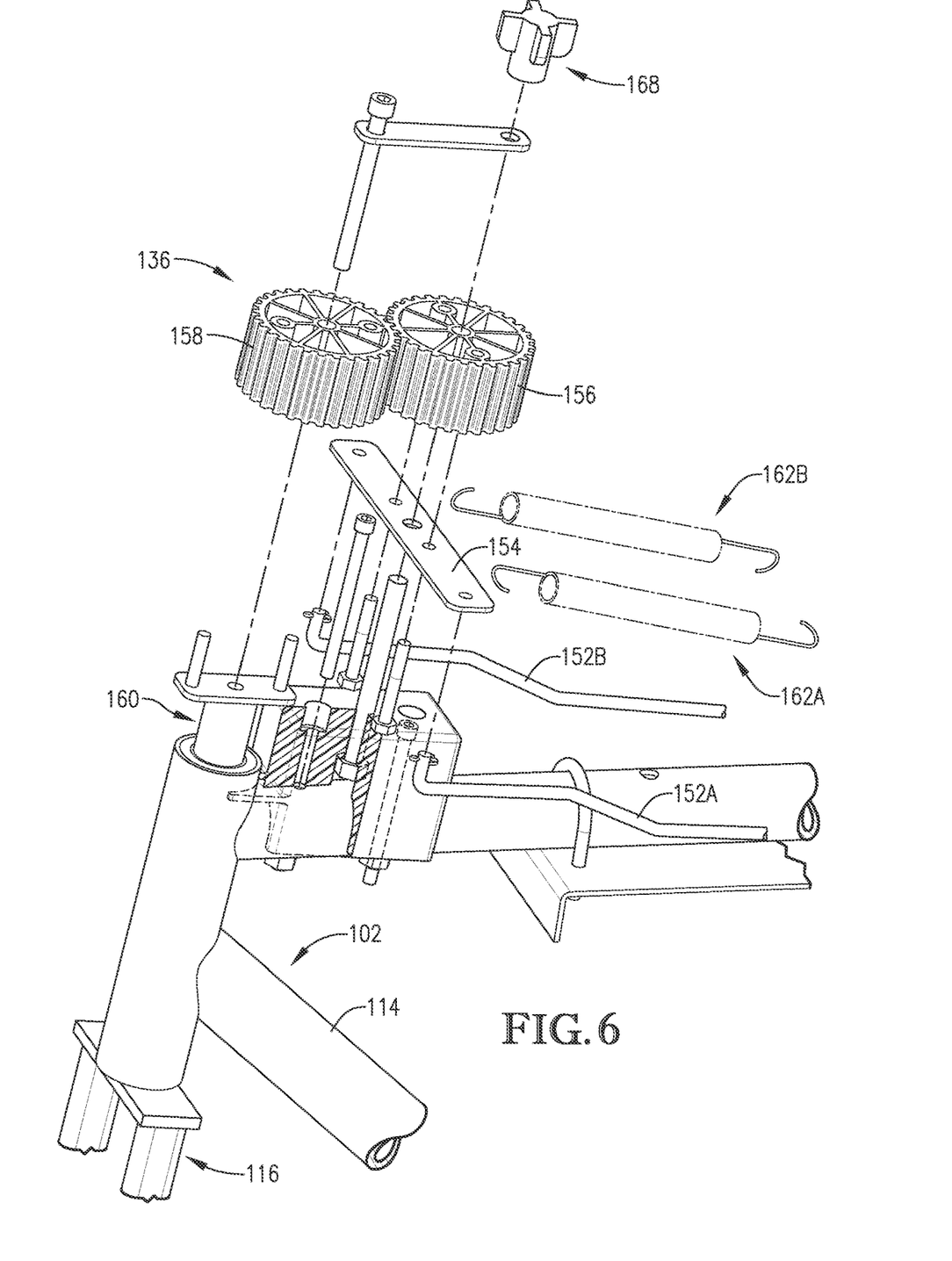
FIG. 6 is an enlarged exploded perspective view of portions of the rider-propelled vehicle of FIG. 1.

As best seen in FIGS. 4-6, the steering train 136 transfers steering inputs from the left and right handles 144A,B to the front fork 116 and hence the front wheel assembly 108. The steering train 136 includes left and right pivot pins 150A, B, left and right steering links 152A,B, a steering bar 154, a steerer gear 156, a steered gear 158, a steered shaft 160, and left and right biasing elements 162A,B.

The left pivot pin 150A connects the left pivot arm 140A to the left steering link 152A. To that end, the left pivot pin 150A may be configured to rotate about its longitudinal axis relative to the left pivot arm 140A. Furthermore, the left pivot pin 150A may be connected to the left steering link 152A in coincidence with the laterally extending arm mechanics drive axis when the steering train 136 is in a neutral position.

The right pivot pin 150B connects the right pivot arm 140B to the right steering link 152B and may have a substantially vertical orientation. To that end, the right pivot pin 150B may be configured to rotate about its longitudinal axis relative to the right pivot arm 140B. Furthermore, the right pivot pin 150B may be connected to the right steering link 152B in coincidence with the laterally extending arm mechanics drive axis when the steering train 136 is in the neutral position.

The left steering link 152A connects the left pivot pin 150A to the left end of the steering bar 154 and may have a substantially rearward to forward orientation. The left steering link 152A may be connected to the left pivot pin 150A in coincidence with the laterally extending arm mechanics drive axis when the steering train 136 is in the neutral position.

The right steering link 152B connects the right pivot pin 150B to the right end of the steering bar 154 and may have a substantially rearward to forward orientation. The right steering link 152B may be connected to the right pivot pin 150B in coincidence with the laterally extending arm mechanics drive axis when the steering train 136 is in the neutral position.

The steering bar 154 connects the steerer gear 156 and the left and right steering links 152A,B. Specifically, the steering bar 154 may be aligned with a central axis of the steerer gear 156 near a middle of the steering bar 154 and may be pivotably connected to the left and right steering links 152A,B near left and right ends of the steering bar 154.

The steerer gear 156 may be aligned with the steering bar 154 near a middle of the steering bar 154 so that the steerer gear 156 and the steering bar 154 rotate in unison about the central axis of the steerer gear 156. Teeth of the steerer gear 156 may also be entrained with teeth of the steered gear 158 so that clockwise rotation of the steerer gear 156 imparts counterclockwise rotation of the steered gear 158. The steerer gear 156 may be tightened or adjusted via gear adjuster 168. In one embodiment, the steerer gear 156 is configured to rotate in an opposite rotational direction relative to the steered gear 158, the steering fork 116, and the front wheel assembly 108.

The steered gear 158 may be aligned with the steered shaft 160 so that the steered gear 158 and steered shaft 160 rotate in unison about co-located central axes of the steered gear 158 and the steered shaft 160. Teeth of the steered gear 158 may be entrained with teeth of the steerer gear 156 as described above. In one embodiment, the steered gear 158 and the steerer gear 156 are identical, which reduces the part count or simplifies the bill of materials for the rider-propelled vehicle 100. Alternatively, the steered gear 158 and steerer gear 156 may be different sizes to implement a gear reduction or mechanical advantage in the steering train 136.

The steered shaft 160 may extend downward from the steered gear 158 to the front fork 116. The steered shaft may be coaxially aligned with the steered gear 158 as described above and may be configured to rotate in unison with the front fork 116. The steered shaft 160 may also pass through a front of the chassis 114 so that the steering train 136 and front wheel assembly 108 are aligned with the chassis 114.

The left and right biasing elements 162A,B may be connected between the chassis 114 and the steering bar 154. The biasing elements 162A,B may be coil springs, leaf springs, elastic bands, or the like. The left and right biasing elements 162A,B may be configured to urge the steering train 136 and hence the front wheel assembly 108 to the neutral position.

Certain components of the rider-propelled vehicle 100 may be at least partially protected by covers. For example, the left and right pivot arms 140A,B and left and right pivot pins 150A,B may be at least partially enclosed by left and right pivot arm covers 164A,B. Similarly, the steerer gear 156 and steered gear 158 may be at least partially enclosed by gear cover 166. The covers prevent debris and dirt from coming into contact with these components, which may impact their performance. The covers also guard the rider against potential pinch points between these components.

The above-described rider-propelled vehicle 100 provides several advantages. For example, the left and right pedals 128A,B may extend laterally exterior from the left and right drive links 130A,B so that feet of the rider can straddle the left and right drive links 130A,B. To that end, the left and right handlebar assemblies 132A,B may extend diagonally upward and laterally outward. This provides improved ergonomics and motion for the rider's arm mechanics and allows the left and right handlebar assemblies 132A,B to connect to the left and right drive links 130A,B laterally inward from the left and right pedals 128A,B. Furthermore, the rear wheel assembly 106 and front wheel assembly 108, while including 24 inch (ISO 507 mm) wheels or larger, may have a sufficiently large wheelbase and the steering train 136 may be configured such that the front wheel assembly 108 turns entirely forward a range of motion of the left and right handlebar assemblies 132A,B.

The left and right pivot arms 140A,B may extend laterally inward from the left and right handlebar assemblies 132A,B, which sleekens the rider-propelled vehicle 100. The left and right pivot pins 150A,B may be connected to the left and right steering links 152A,B in coincidence with the laterally extending arm mechanics drive axis when the steering train 136 is in a neutral position. This simplifies drive and steering mechanics.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A rider-propelled vehicle comprising:
    a frame;
    a rear wheel assembly rotatably connected to the frame;
    a front wheel assembly rotatably connected to the frame and spaced forward from the rear wheel assembly; and
    a dual drive and steering assembly that coalesces forces from leg and arm mechanics and accommodates steering inputs without affecting the leg and arm mechanics,
    the rear wheel assembly and the front wheel assembly including wheels having a minimum 24 inch (ISO 507 mm) size.

2. The rider-propelled vehicle of claim 1, the dual drive assembly including left and right handlebar assemblies, left and right pedals, and left and right drive links connecting the left and right handlebar assemblies to the left and right pedals, the left pedal extending laterally exterior from the left drive link and the right pedal extending laterally exterior from the right drive link so that feet of the rider straddle the left and right drive link.

3. A rider-propelled vehicle comprising:
    a frame including a chassis and a steering fork pivotably connected to the chassis;
    a rear wheel assembly rotatably connected to the chassis;
    a front wheel assembly rotatably connected to the steering fork and spaced forward from the rear wheel assembly;
    a dual drive and steering assembly comprising:
        left and right pedal arms pivotably connected to the chassis;
        a left pedal pivotably connected to the left pedal arm;
        a right pedal pivotably connected to the right pedal arm;
        a left drive link pivotably connected to the left pedal arm; and
        a right drive link pivotably connected to the right pedal arm;
        a left handlebar assembly pivotably connected to the chassis, and pivotably connected to the left drive link near a lower end of the left handlebar assembly; and
        a right handlebar assembly pivotably connected to the chassis, and pivotably connected to the right drive link near a lower end of the right handlebar assembly; and
        a steering train steerably connecting the left and right handlebar assemblies to the steering fork and configured to impart steering inputs from the rider to the front wheel assembly via the left and right handlebar assemblies, the steering train including a steerer gear and a steered gear, the steerer gear being configured to rotate in an opposite rotational direction relative to the steered gear, the steering fork, and the front wheel assembly; and a drive train drivably connecting the dual drive and steering assembly to the rear wheel assembly and configured to coalesce forces from leg and arm mechanics of a rider via the left and right handlebar assemblies, the left and right drive links, and the left and right pedal arms, the left pedal extending laterally exterior from the left drive link and the right pedal extending laterally exterior from the right drive link so that feet of the rider straddle the left and right drive link.

4. The rider-propelled vehicle of claim 3, the steerer gear and the steered gear being identical.

5. The rider-propelled vehicle of claim 3, the left handlebar assembly including a left upper member, a left lower member, and a left pivot arm extending laterally inward from the left upper member, the left upper member and the left lower member being coaxially aligned with each other, the left upper member and the left pivot arm being configured to rotate relative to the left lower member, the right handlebar assembly including a right upper member, a right lower member, and a right pivot arm extending laterally inward from the right upper member, the right upper member and the right lower member being coaxially aligned with each other, the right upper member and the right pivot arm being configured to rotate relative to the right lower member.

6. The rider-propelled vehicle of claim 5, further comprising left and right control assemblies, the left control assembly being rotatably coupled to the left upper member, the right control assembly being rotatably coupled to the right upper member.

7. The rider-propelled vehicle of claim 3, the steering train further comprising left and right pivot pins extending downward from the left and right pivot arms, left and right steering links extending forward from the left and right pivot pins, and a steering bar rotationally coupled to the steerer gear and pivotably connected to the left and right steering links.

8. The rider-propelled vehicle of claim 7, the left and right pivot pins being pivotably connected to the left and right steering links, and the left and right handlebar assemblies being pivotably connected to the frame along a substantially horizontal and laterally-extending axis.

9. The rider-propelled vehicle of claim 7, the steering train further comprising biasing elements configured to urge the front wheel assembly to a neutral position.

10. The rider-propelled vehicle of claim 3, the left handlebar assembly and the right handlebar assembly extending diagonally upward and laterally outward.

11. A rider-propelled vehicle comprising:
a frame including a chassis and a steering fork pivotably connected to the chassis;
a rear wheel assembly rotatably connected to the chassis;
a front wheel assembly rotatably connected to the steering fork and spaced forward from the rear wheel assembly, the rear wheel assembly and the front wheel assembly including wheels having a minimum 24 inch (ISO 507 mm) size;
a dual drive and steering assembly comprising:
left and right pedal arms pivotably connected to the chassis;
a left pedal pivotably connected to the left pedal arm;
a right pedal pivotably connected to the right pedal arm;
a left drive link pivotably connected to the left pedal arm; and
a right drive link pivotably connected to the right pedal arm;
a left handlebar assembly pivotably connected to the chassis, and pivotably connected to the left drive link near a lower end of the left handlebar assembly; and
a right handlebar assembly pivotably connected to the chassis, and pivotably connected to the right drive link near a lower end of the right handlebar assembly,
the left and right handlebar assemblies having a range of motion; and
a steering train steerably connecting the left and right handlebar assemblies to the steering fork; and
a drive train drivably connecting the dual drive and steering assembly to the rear wheel assembly and configured to coalesce forces from leg and arm mechanics of a rider via the left and right handlebar assemblies, the left and right drive links, and the left and right pedal arms,
the steering train being configured to impart steering inputs from the rider to the front wheel assembly via the left and right handlebar assemblies so that the front wheel assembly turns entirely forward of the range of motion of the left and right handlebar assemblies.

12. The rider-propelled vehicle of claim 11, the steering train including a steerer gear and a steered gear, the steerer gear being configured to rotate in an opposite rotational direction relative to the steered gear, the steering fork, and the front wheel assembly.

13. The rider-propelled vehicle of claim 12, the steerer gear and the steered gear being identical.

14. The rider-propelled vehicle of claim 11, the left handlebar assembly including a left upper member, a left lower member, and a left pivot arm extending laterally inward from the left upper member, the left upper member and the left lower member being coaxially aligned with each other, the left upper member and the left pivot arm being configured to rotate relative to the left lower member, the right handlebar assembly including a right upper member, a right lower member, and a right pivot arm extending laterally inward from the right upper member, the right upper member and the right lower member being coaxially aligned with each other, the right upper member and the right pivot arm being configured to rotate relative to the right lower member.

15. The rider-propelled vehicle of claim 14, further comprising left and right control assemblies, the left control assembly being rotatably coupled to the left upper member, the right control assembly being rotatably coupled to the right upper member.

16. The rider-propelled vehicle of claim 12, the steering train further comprising left and right pivot pins extending downward from the left and right pivot arms, left and right steering links extending forward from the left and right pivot pins, and a steering bar rotationally coupled to the steerer gear and pivotably connected to the left and right steering links.

17. The rider-propelled vehicle of claim 16, the left and right pivot pins being pivotably connected to the left and right steering links, and the left and right handlebar assemblies being pivotably connected to the frame along a substantially horizontal and laterally-extending axis.

18. The rider-propelled vehicle of claim 11, the left handlebar assembly and the right handlebar assembly extending diagonally upward and laterally outward.

19. A rider-propelled vehicle comprising:
   a frame including a chassis and a steering fork pivotably connected to the chassis;
   a rear wheel assembly rotatably connected to the chassis;
   a front wheel assembly rotatably connected to the steering fork and spaced forward from the rear wheel assembly;
   a dual drive and steering assembly comprising:
      left and right pedal arms pivotably connected to the chassis;
      a left pedal pivotably connected to the left pedal arm;
      a right pedal pivotably connected to the right pedal arm;
      a left drive link pivotably connected to the left pedal arm; and
      a right drive link pivotably connected to the right pedal arm;
      a left handlebar assembly pivotably connected to the chassis, and pivotably connected to the left drive link near a lower end of the left handlebar assembly; and
      a right handlebar assembly pivotably connected to the chassis, and pivotably connected to the right drive link near a lower end of the right handlebar assembly; and
      a steering train steerably connecting the left and right handlebar assemblies to the steering fork and configured to impart steering inputs from the rider to the front wheel assembly via the left and right handlebar assemblies; and
   a drive train drivably connecting the dual drive and steering assembly to the rear wheel assembly and configured to coalesce forces from leg and arm mechanics of a rider via the left and right handlebar assemblies, the left and right drive links, and the left and right pedal arms,
   the left pedal extending laterally exterior from the left drive link and the right pedal extending laterally exterior from the right drive link so that feet of the rider straddle the left and right drive link,
   the left handlebar assembly and the right handlebar assembly extending diagonally upward and laterally outward.

* * * * *